UNITED STATES PATENT OFFICE.

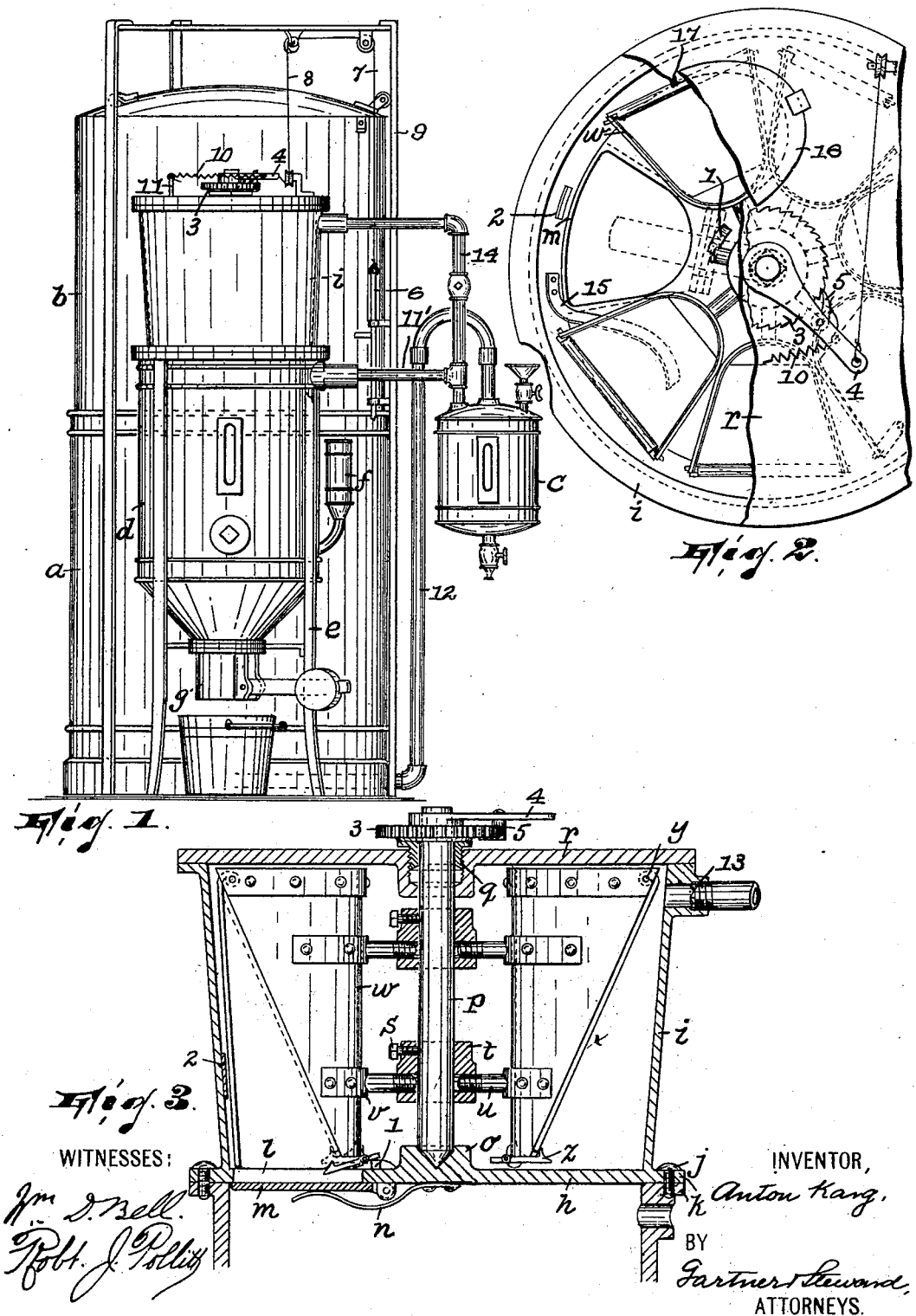

ANTON KARG, OF PATERSON, NEW JERSEY.

ACETYLENE-GAS GENERATOR.

SPECIFICATION forming part of Letters Patent No. 706,067, dated August 5, 1902.

Application filed January 4, 1902. Serial No. 88,385. (No model.)

*To all whom it may concern:*

Be it known that I, ANTON KARG, a citizen of the United States, residing in Paterson, in the county of Passaic and State of New Jersey, have invented certain new and useful Improvements in Acetylene-Gas Generators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to apparatus for generating and storing acetylene gas; and it consists in certain improvements in apparatus of this nature, hereinafter particularly pointed out and finally embodied in the clauses of the claim, looking toward rendering such apparatus more simple and durable in construction and more reliable and effective in operation.

The invention will be found fully illustrated in the accompanying drawings, wherein—

Figure 1 is a side view of the improved apparatus. Fig. 2 is an enlarged top plan view, with a portion of the top cut away, of the generating portion of the apparatus; and Fig. 3 is a vertical sectional view of the upper part of that portion of the apparatus which is shown in Fig. 2.

The usual gas-receiver or gasometer, consisting of a base-section $a$ and an upper or movable section $b$, is made use of in connection with my improved apparatus, as is also the gas-purifier $c$.

$d$ designates the generating-chamber, the same being mounted on suitable legs or supports $e$ and being provided with the usual filling device $f$ and discharge $g$ for the sediment. The top of this chamber is adapted to be closed by the lower wall $h$ of another chamber $i$ by means of bolts $j$ engaging the flanges $k$ of said chambers. Said wall $h$ has an opening $l$, normally closed by a trap $m$, against which a light plate-spring $n$, secured to said wall $h$, bears. The center portion of the wall $h$ is formed as a step-bearing $o$ for a vertical shaft $p$. This shaft extends upwardly through a stuffing-box $q$ in the top wall $r$ of the chamber $i$. On the shaft $p$ are secured adjustably, by means of set-screws $s$, blocks $t$, into which are screwed radial arms $u$. To the arc-shaped extremities $v$ of corresponding arms $u$ are secured carbid-holders $w$. Each one of said holders is substantially the shape of a half-cylinder, having its outer wall $x$ hinged to the holder at the upper end thereof, as at $y$, and normally (i. e., when closed) inclined substantially toward the junction of the inner and lower sides of the receptacle. A hook or catch $z$, pivoted in the lower portion of the holder and extending under the same, is adapted to keep each wall $x$ of the holders closed.

1 is a detent arranged near the opening $l$ and adapted to engage with its upper face, which is inclined, the rear end of each catch $z$, so as to trip the same, as shown in Fig. 3, and thus permit the wall $x$ to open by gravity, so that the contents of the holder may be discharged. The side wall of the chamber $i$ is provided with a buffer 2, against which the walls $x$ may impinge.

On the upper end of the shaft $p$ is secured rigidly a ratchet 3 and also loosely a crank or lever 4, carrying a spring-actuated pawl 5, engaging said ratchet. The lever is connected with a suitable attachment 6 on the movable section $b$ of the gasometer by means of a flexible connection 7, passing over pulleys 8, carried by the frame 9 of the gasometer and the chamber $i$. The lever is pulled by the connection 7 against the tension of a spiral spring 10, connecting said lever with a pin 11 on the chamber $i$. Thus each time the section $b$ of the gasometer falls by reason of its supply of gas becoming low the lever is turned, and, through the pawl and ratchet, turns the shaft $p$. When said shaft has turned far enough so that the catch $z$ of the carbid-holder next in line to discharge its contents engages the detent 1, a new quantity of carbid will be dropped into the generating-chamber $d$, it being understood that the weight of the carbid is adapted to overcome the spring $m$, so as to open the trap $n$. The consequent generation of gas and conveying thereof into the gasometer will cause the section *b* thereof to rise, thereby releasing and permitting the resetting of the pawl-carrying lever 4.

The chamber *d* is connected at its upper end with the purifier *c* by a pipe 11'. The purifier is in turn connected with the lower portion of the gasometer by a pipe 12. In the pipe 11' is arranged a filter for straining the gas as much as possible before it enters the purifier. In order to obviate accident growing out of the possibility that the strainer 13 may become clogged, and so confine the gas to the relatively small chamber *d*, the pipe 11' is connected with the upper part of the chamber *i* by another pipe 14, so that the next time the mechanism operates and the trap *m* is opened by the falling carbid the gas may escape by way of the chamber *i* into the purifier.

15 is an elongated curved cam which is adapted to engage the lower ends of the walls *x*, so as to automatically close them as they successively approach it after the discharge of carbid has been effected.

16 is simply a closure for the opening 17, whereby the carbid-holders are filled.

Having thus fully described my invention, what I claim as new, and desire to secure by Letters Patent, is—

1. In an acetylene-gas apparatus, a carbid-holder consisting of a receptacle or body portion open at the top and also opening downwardly, and a closure controlling the lower opening of said receptacle hinged thereto near the upper end of said opening, said closure being normally disposed at an incline, substantially as described.

2. In an acetylene-gas apparatus, a carbid-holder open at the top and having one of its walls hinged near the upper end of said holder and extending at an incline across the same to form a closure therefor, in combination with means for maintaining said wall in its closed position, substantially as described.

In testimony that I claim the foregoing I have hereunto set my hand this 21st day of December, 1901.

ANTON KARG.

Witnesses:
 JOHN W. STEWARD,
 ROBERT J. POLLITT.